Oct. 11, 1932.                G. MENGER                1,882,024
                             VEHICLE SPRING
                          Filed April 27, 1929
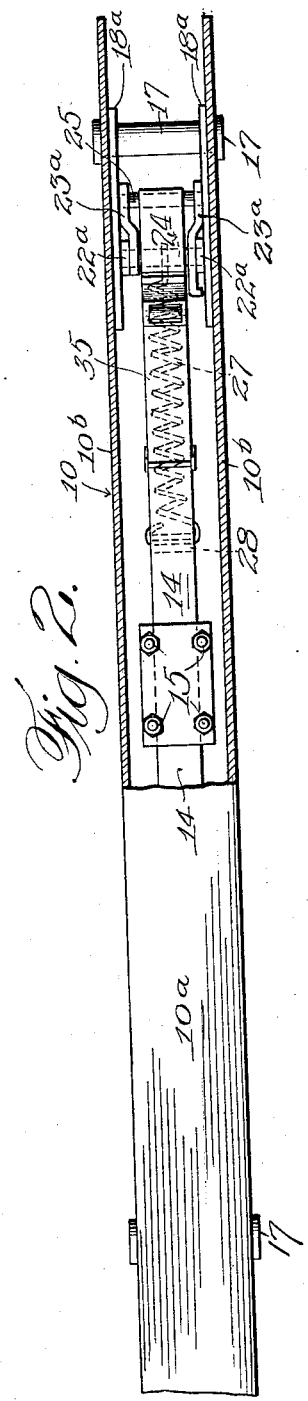
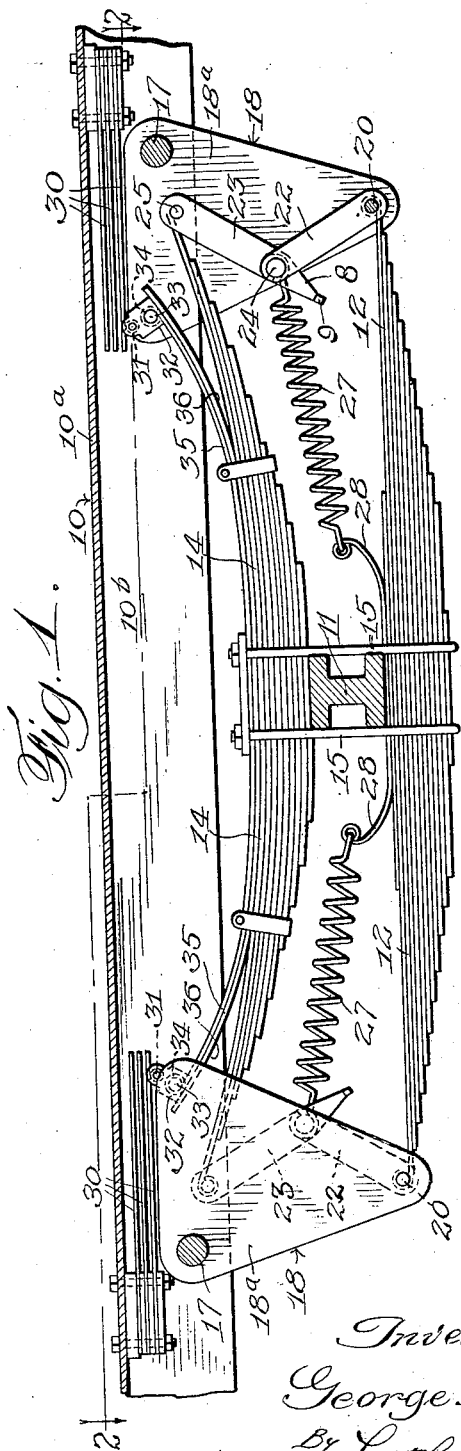
Inventor
George Menger
By Luther Johns
Atty.

Patented Oct. 11, 1932

1,882,024

UNITED STATES PATENT OFFICE

GEORGE MENGER, OF OAK PARK, ILLINOIS

VEHICLE SPRINGS

Application filed April 27, 1929. Serial No. 358,516.

These improvements relate to springs for vehicles. Their most important application at the present time is in connection with automobiles of the larger and heavier type, and have been designed principally with a view to rendering travel in buses and the like more comfortable, as well as to save wear and tear on vehicle parts through the provision of more advantageous cushioning means between the body and the respective axles. Other objects and advantages will appear hereinafter.

Figure 1 of the drawing shows an automobile frame in vertical longitudinal section with an embodiment of these improvements in side elevation, with a plate at the right hand end removed; and Fig. 2 is a fragmentary horizontal sectional view on the line 2—2 of Fig. 1.

The automobile frame member 10 is of channel-iron having an upper wall 10a and side walls 10b. To the axle 11 are secured the two elongated leaf springs 12 and 14, midway between their ends respectively, as by the U-bolts 15. They are shown one above the other, an arrangement making for notable advantage, but they may be otherwise positioned.

Since the construction is the same at both ends of the device shown a description for one end will suffice.

Passing through the flanges 10b of the frame is a pin 17 on which is mounted a pair of flat downwardly-hanging leaves or plates 18a, of substantially triangular shape. They are between the frame side walls 10b, and at the bottom they are held together by a pin 20. The two leaves 18a constitute a single supporting member designated 18 as a whole. It has rocking relationship with the frame at the pivot pin 17, which pin is at the upper and outer corner portion of the triangular device.

The lower spring marked 12 has its outer end extending between the plates 18a and is strongly secured to pin 20 preferably by a turn around the pin formed in one or more of the extending leaves of the spring.

Oppositely-disposed and corresponding links 22a (Fig. 2) constitute a single link structure marked 22 as a whole in Fig. 1, and similar oppositely-disposed links 23a form the single link structure marked 23. These pairs of links are connected at their inner end portions by a pin 24. The lower end of link structure 22 is mounted to rock on a pin 20 while the upper end of link structure 23 is mounted to rock on a pin 25. The construction just described constitutes a toggle or break-joint connection. It permits lost-motion.

The upper spring 14 has its end portion extending between the plates 18a, and also between the link elements 23a, and is secured, preferably by a turn of one or more of the spring leaves, to the pin 25.

A substantially strong spring 27, suitably but not necessarily a coil spring, is held to pin 24 at one end of the spring and to anchoring means shown as a short leaf 28 issuing from the body of laminations of the spring 12. These spring means 27, and to some extent the leaf 28 where, as in the construction shown, it has spring properties, tends to draw the knuckle of the toggle inward.

Secured to the frame 10, as by bolts, are a plurality of flat leaf springs 30 extending parallel with and close to the base 10a of the frame. A roller 31 contacts the lowermost one of the springs 30. This roller is mounted in a frame 32 which in turn is mounted on the ends of a pin 33 around which there is a turn 34 of the leaf 35 issuing from the top of the laminated spring 14. The leaf 36 immediately below the leaf 35 projects beyond the frame 32 and holds the frame 32 and consequently the roller 31 in position. The roller 31 and its associated parts including the ends of the leaves 35 and 36 extend freely between the sideplates 18a of the supporting member.

With the foregoing understanding the operation may be described together with other details of construction.

In Fig. 1 the lower main spring 12, which I am denoting the primary spring, would normally have its ends bowed upward somewhat, after the general configuration of the upper or secondary spring 14, provided there were no load on the frame 10. Fig. 1 contemplates that there is sufficient load on the frame to flex the end portions of the primary spring 12 downward to the extent shown. This weight may be merely the weight of the body of the car free of passengers or other load, but it may be greater or less than that according to the particular application. Assuming that a load be added to this initial load mentioned, the effect is to bend the ends of the primary spring 12 downward still farther, the amount of such downward flexing being, of course, dependent upon the load added. The effect of such downward flexing of spring 12 is to tend to straighten out the toggle 22—23. The spring 27 offers immediate resistance to such effort, as does also the spring 14 at the pin 25. When the load becomes great enough the lower spring 12 is flexed sufficiently to overcome the resistance of springs 27 and 14 to such extent that the links 22 and 23 come substantially or nearly into alignment with each other. These links would come actually into alignment were it not for stop means shown as an extension 8 of the links 23a, together with a stop projection 9 engaging the edges of links 22 respectively when the toggle is nearly straightened out. With a stop as 9 limiting further such movement there is a direct pull through the links upon the spring 14.

Note that spring 12 was flexed into its position shown in Fig. 1 without much flexing of springs 27 and 14, and that on the addition of load the springs 27 and 14 cooperate to resist further flexing of spring 12. At such time all three springs 12, 27 and 14 are carrying the load. As the lowering of the body relative to the axle 11 continues, under added load or its equivalent, the resistance of the three springs increases until finally the toggle is straightened out to the extent possible and then there is a direct pull from pin 20 to pin 25. At such time spring 27 is still effective however for its tendency is to retract the toggle connection, so that at such time the pull between the pins 20 and 25 is maintaining the spring 27 at the maximum tension permitted for it by the construction.

According to the load from time to time the toggle will be more or less straightened out within its limits of movement. The load in question from time to time is not only the load actually being carried by the car but such also as is induced by inequalities of the road, adding the effects of momentum or inertia to the load proper.

The toggle may straighten out suddenly when the wheels suddenly enter a rut and the downward momentum of the load is thus suddenly and additionally imposed upon the springs. When the limit of downward movement of the body is reached it is as if the excess load were removed or lessened. The first result is that the spring 27 breaks the toggle alignment. From this it follows that the body is not violently thrown upward by the combined action of springs 12, 27 and 14. Those three springs took the severe load when the body was going down, but now that they have done their work in that behalf two of them, namely springs 27 and 14, are gradually relieved of duty to the extent of the added load due to momentum.

On the ensuing rebound the toggle will move inward to such a limited extent as is determined by the actual load. The load carried will determine the normal position of the links 22 and 23 when running on a level road or when the car is standing. When momentum weight is added the links may straighten out, as mentioned, to develop all of the available strength of spring 14, or they may merely come more nearly into a straight line, all depending upon the force of the equivalent of added weight. However, when this added equivalent of weight is being removed, as when the downward movement of the body is gradually reaching its limit, the links 22 and 23 gradually assume their position normal to the load proper. That condition will have obtained at least by the time the body of the car has recovered its normal elevation. At such time, on the recovery, the springs 27 and 14 cooperate with spring 12 in raising the body to its normal elevation and then springs 27 and 14 discontinue their effort in that direction.

Note that springs 27 and 14 are pulling against each other at such time. The end of spring 14 wants to move upward on the rebound but spring 27 is operating to hold it down. They both communicate lifting strains to the end of spring 12; but this lifting force by springs 27 and 14 diminishes very rapidly, and the conditions exist for permitting them to come into equilibrium with each other before spring 12 has been relieved. Such equilibrium is reached between springs 27 and 14 when they are under the strain of the load proper, which is also at the time when the body has regained its normal elevation. The upward throw of the body is therefore greatly reduced in extent. Furthermore, the tendency of spring 12 to vibrate downward after the upward rebound is markedly checked by springs 27 and 14.

The same sort of action occurs if we assume the wheels in a rut and suddenly climbing out under the power of the engine. This moves the axle upward and, under the added equivalent of weight, namely the inertia of the body to move upward, the end of the spring 12 is flexed as if downward, straightening out to a greater or lesser extent the toggle links and imposing such strains as are called for upon the springs 27 and 14. The wheels having come out of the rut, and the body being lowered beyond the normal, the tendency of spring 12 is to throw the body upward, as is that also of springs 27 and 14. As soon, however, as the body has regained its normal elevation according to the load proper spring 27 has drawn the toggle joint inward and the tendency to throw the body upward is left to spring 12 alone. That spring being weak relative to the strains the objectionable rebound does not occur.

When the pin 25 moves upward the roller 31 contacts the lowermost one of the leaves 30, and when that leaf is flexed, and as the action continues, the next in series comes into play, and then the next, so that through these springs 30, illustrated as three in number and spaced apart vertically, such upward movement of the end of the spring 14 at the pin 25 is cushioned, which cushioning is increased through the resiliency of the leaf springs 35 and 36 issuing from the main body of leaves of the spring 14.

The toggle links may suddenly be straightened out to their full extent when the wheel runs over a stone, throwing the axle upward relative to the body. Such a sudden movement would be cushioned not only by the springs 12 and 14 at pins 20 and 25 respectively, but this further cushioning effect of the springs 30, 35 and 36 would be had.

The car having passed over an elevation in the road or having dropped into a rut, permitting the wheels to drop, the tendency of the body is to drop also. The load at such time is to a substantial extent removed from the springs, and the spring 27 pulls the toggle connection inward so that the lowering of the car may be at first substantially against the resistance of spring 12 only, depending on the drop of the wheel. That spring is flexed with a gentle movement, until its horizontal position as shown by Fig. 2 is reached when the added spring tension of springs 27 and 14 are brought into play. The effect is that a substantially soft and easy cushioning effect is had on the downward movement of the body throughout a considerable part of that movement, and then when the movement is well slowed and almost at an end additional resistance is introduced. For another matter, the strong force usually incident to automobile springs driving the wheels downward into a depression is greatly reduced by the present construction.

The device illustrated provides not only that a very heavy load may be carried, but that the sudden shocks and jars incident to travel on the road are compensated for by spring elements in such a peculiar way as to render the travel far more comfortable and with greater safety to both passengers, freight and vehicle, than I believe has heretofore been known.

Another feature is in the fact that the body of the car is maintained more nearly vertical on steeply-crowned roads and on curves, etc., with considerable swaying of the car overcome, a feature of much importance in connection with double-deck busses and similar high cars. This arises from the fact that as the load or equivalent of load is shifted to or imposed on one side additional spring forces come into play on that side to prevent its excessive lowering, while the side relieved of weight is not thrown violently upward.

The construction shown is advantageous in various other ways. The lower spring, under the most severe flexing strains, being mounted below the axle, may be readily replaced. Should it break while in service the body of the car will still be supported by spring 14 and springs 30 since the frame would lower to bring them into play. By placing the springs 12 and 14 one above and one below the axle suitable space is provided for their action and for the toggle connection and spring 27.

I contemplate as being included in the present invention all such changes, variations and departures from what is thus specifically illustrated and described as fall within the scope of the appended claims.

I claim:

1. The combination with the frame and axle of a vehicle, of a pair of elongated springs, one thereof being primary and the other secondary, one being above the other and both being carried by the axle intermediate the ends of the springs respectively, means communicating weight from the frame directly to end portions of the primary spring to flex the same, and means operative only when said spring has been flexed a predetermined amount for communicating weight from the frame to end portions of the secondary spring, said last-mentioned means including a toggle connection and auxiliary spring means connected to the toggle and arranged to resist the flexing of the primary spring more than such predetermined amount.

2. The combination with the frame and axle of a vehicle, of a pair of elongated springs, one thereof being primary and the other secondary, one being above the other and both being carried by the axle intermediate the ends of the springs respectively, means communicating weight from the frame directly to end portions of the primary spring to flex the same, and means operative only when said spring has been flexed a predetermined amount for communicating weight from the frame to end portions of the secondary spring, said last-mentioned means including toggle link connections between end portions respectively of said springs and auxiliary spring means operative with said link connections and adapted to cooperate with the secondary spring to resist further flexing of the primary spring.

3. The combination with the frame and axle of a vehicle, of a pair of elongated springs, one thereof being primary and the other secondary, one being above the other and both being carried by the axle intermediate the ends of the springs respectively, means communicating weight from the frame directly to end portions of the primary spring to flex the same, and means operative only when said spring has been flexed a predetermined amount for communicating weight from the frame to end portions of the secondary spring, said last-mentioned means including toggle links between end portions of said springs, spring means adapted to maintain said toggle links in non-aligned relation with respect to each other while said primary spring is being flexed up to such predetermined amount and on further flexing of the primary spring to yield under tension whereby said links may come into alignment with each other and communicate further flexing movement of the primary spring to the secondary spring directly through the toggle links.

4. The combination with a frame and axle of a vehicle, of a pair of elongated springs, one thereof being primary and the other secondary, one being above the other and both being carried by the axle intermediate the ends of the springs respectively, the construction at one end of said springs comprising a spring-supporting member pivotally carried by the frame for rocking movements in normally vertical planes, said primary spring being carried at one of its ends by said supporting member at a place below the pivotal mounting of said supporting member whereby said supporting member will rock on its pivotal connection when said spring is flexed, a flexed toggle and spring means resisting the straightening of the toggle connecting the primary spring operatively with the secondary spring against the resistance of said spring means so as to flex the secondary spring only after the primary spring has been flexed a predetermined amount, and means for cushioning the rebound movement of the secondary spring.

5. The combination with the frame and axle of a vehicle, of a pair of elongated springs positioned one above the other, means connecting the vehicle frame directly with end portions of one of said springs to flex the same, and means connecting end portions of said one of said springs with end portions respectively of the other of said springs to flex the same only after the first-mentioned spring has been flexed a predetermined amount on a continuous flexing movement, said last-mentioned means including a connection providing lost-motion and a spring cooperating to resist such lost-motion and being adapted to be placed under tension when the first-mentioned spring has been flexed such predetermined amount and is then further flexed.

6. The combination with the frame and axle of a vehicle, of two springs arranged to cooperate with each other in supporting the load, a toggle connection connected operatively between the two springs for communicating flexing strains from one of said springs to the other thereof, and spring means controlling the operation of said toggle to communicate a greater or a lesser amount of flexing strain from one to the other of said springs.

7. The combination with the frame and axle of a vehicle, of a plurality of springs adapted to carry the load, means for communicating weight of the load to one of said springs to flex the same, means for communicating flexing movement of said one of said springs to two others of said springs only after said one of said springs has been flexed a predetermined amount, said last-mentioned means being adapted to render inoperative said two other springs during the rebound of said one of said springs from a fully flexed position to a less-flexed position thereof.

GEORGE MENGER.